United States Patent

[11] 3,594,850

[72] Inventor Charles K. Wellington
Westford, Mass.

[21] Appl. No. 880,803
[22] Filed Nov. 28, 1969
[45] Patented July 27, 1971

[73] Assignee Viatron Computer Systems Corporation
Bedford, Mass.

[54] SPRAY CLEANING CARTRIDGE
8 Claims, 4 Drawing Figs.

[52] U.S. Cl. ........................................ 15/405, 15/414, 134/172, 274/47
[51] Int. Cl. ........................................ B08b 3/02, B08b 5/02
[50] Field of Search ........................................ 15/405, 414, 306 A; 134/172, 198; 242/199; 274/47; 179/100.2 Z

[56] References Cited
UNITED STATES PATENTS

| | | | |
|---|---|---|---|
| 3,370,982 | 2/1968 | Hayunga ...................... | 15/405 X |
| 3,439,922 | 4/1969 | Howard ........................ | 274/47 |

*Primary Examiner*—Daniel Blum
*Attorney*—James J. Cannon

ABSTRACT: A cartridge for cleaning the pickup heads of tape recording and playback devices which use a recording tape enclosed in removable cartridges. The cleaning cartridge has the same outer shape as the regular tape-filled cartridges and replaces the recording tape with a spray cleaning nozzle and duct system. The cartridge is inserted into the recording and playback device in the same way as a regular tape cartridge and cleaning fluid is sprayed onto the recording elements of the machine by coupling a source of cleaning spray to a spray inlet positioned at an accessible portion of the cleaning cartridge.

INVENTOR.
CHARLES K. WELLINGTON
BY James J. Cannon
ATTORNEY

SPRAY CLEANING CARTRIDGE

BACKGROUND OF THE INVENTION

The present invention relates to a cleaning means for cartridge-type tape recording and playback devices where the tapes being handled are incorporated in a closed cassette or cartridge and where the cartridges are inserted and removed from suitable receiving slots or supports on the devices.

In devices of this type, the recording heads and their related structures are normally mounted in an enclosed location as the cartridges are most easily positioned by being inserted into a slotlike aperture or a partially enclosed support. The recording heads and related elements of these devices, which contact the moving tape or which are immediately adjacent to the moving tape, have been found to accumulate coatings or deposits of tape coating oxides or other foreign material after the devices have been in use over a period of time. It is desirable, for best operating results, to periodically remove this foreign matter from the recording heads. Various types of cleaners have heretofore been proposed, including those having a cleaning tape substituted for the regular magnetic recording tape, however, these cleaning devices have not proven fully effective particularly with respect to metallic oxide coatings which may have accumulated on the recording elements and particularly on the exposed portions of the recording heads themselves. The concealed position of the heads in the devices has made more thorough cleaning using solvents, including sprayed solvents, impractical if not impossible.

The present invention provides an accessory cartridge including a cleaning fluid distributing system by which the enclosed and critical portions of the recording and playback devices may be exposed directly to cleaning sprays such as spray solvents which are commercially available in pressure or aerosol cans. The cleaning duct system of the cartridge includes a conveniently positioned inlet attachment by which its cleanser distributing system may be directly coupled to a source of cleaning spray such as an aerosol can. The external dimensions and shape of the cleaning cartridge are made to conform to the corresponding shape and dimensions of a regular tape containing cartridge so that it is easily inserted into the recording and playback device.

Accordingly, an object of the present invention is to provide means for cleaning cartridge-type tape recording and playback devices.

Another object of the present invention is to provide simplified and convenient means for spray cleaning concealed portions of cartridge-type tape recorder and playback devices.

Another object of the present invention is to provide a relatively simple and inexpensive spray cleaning attachment for cartridge-type tape recording and playback devices.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawing forming a part of the specification, wherein.

DESCRIPTION OF THE PREFERRED EMBODIMENT

Figures 1, 2, 3, 4:
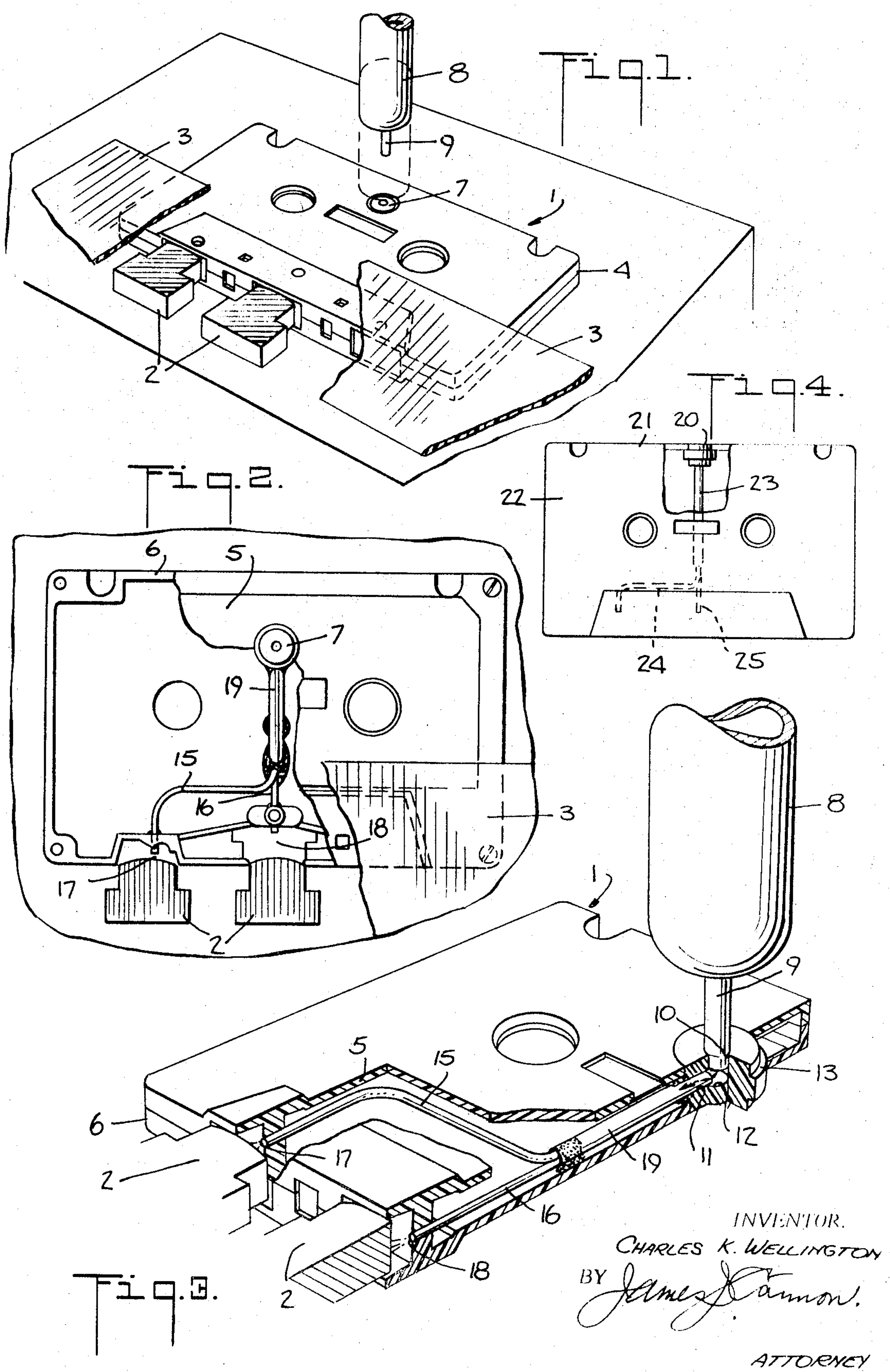
FIG. 1 is a perspective view illustrating a cleaning cartridge in accordance with the present invention positioned in cleaning position in a typical tape recording and playback device.
FIG. 2 is a top plan view of a cartridge in accordance with the present invention shown in cleaning position adjacent a pair of pickup heads.
FIG. 3 is an enlarged fragmentary perspective view partially cut away showing a preferred embodiment of a spray cleaning means in accordance with the present invention.
FIG. 4 is a top plan view partially cut away illustrating another embodiment of a spray cleaning cartridge in accordance with the present invention.

A preferred embodiment of a spray cleaning cartridge or cassette in accordance with the present invention is illustrated at 1 in FIGS. 1 through 3. These figures illustrate a cleaning cartridge 1 for use with the well-known cassette-type of tape recorder reproducer apparatus where during normal operation a magnetic tape is contained in a standardized hollow plastic cartridge case and where the tape is run between spaced supply and pickup spools within the cassette. This well-known type of tape cassette or cartridge, as well as other generally similar cartridges, includes apertures or openings at a surface of the cartridge so that the tape is placed in operative engagement with the recording heads 2 during operation.

In order to provide for a convenient and firm positioning of the cartridges with respect to the heads and also with respect to the tape driving mechanism, the cartridges are arranged to be mounted within cartridge receiving slots or other enclosures such as a cover 3 positioned on the top or front or other convenient surface of the apparatus. To protect the recording heads 2 during use or storage and to obtain maximum operating effectiveness for the heads during use, they are invariably positioned in an at least partially enclosed portion of the apparatus, as for example, within a protective cover such as the type illustrated generally at 3 in the drawings. During normal operation, there is no need for the operator to have direct access to the recording heads as the tapes are moved into and out of operating position by an insertion or a removal of the cartridge or cassette. Insertion of the cartridge automatically positions the recording head or heads within the access apertures of the cartridge while the turntables or spindles are engaged with the cartridge tape spools. The recorder reproducer apparatus also is designed to automatically engage the cartridge tape with the necessary driving spindles in the event that these are separate from the tape spool turntables or spindles. For this reason, typical recorder reproducer devices utilizing cartridges are able to take advantage of the substantially enclosed structures for the recording heads since no access is normally required to these elements.

The preferred embodiment of the cleaning cartridge 1 in accordance with the present invention is seen to include a hollow cartridge case 4 having the outward form and dimensions of the corresponding regular tape cartridges. Such an outer casing is conveniently obtained by using a regular cartridge case with the tape and tape support spools removed to provide space for the spray distributing system. This cartridge typically consists of hollow upper and lower sections 5 and 6 in which the various tape access apertures and the other apertures for the driving and spool spindles may be retained to assist in the cleaning operation.

The principle elements of the cleaning system include a spray coupling inlet 7 for receiving the nozzle of the source of cleaning spray, such as a tubular spray nozzle 9 provided on an aerosol 8 where the aerosol spray may be released by inward pressure on the aerosol nozzle 9 when it has been inserted into the inlet port 10. A preferred form of the coupling inlet 7 comprises a hollow member provided with an inlet port 10 and an outlet port 11 coupled to one another through the hollow center 12 of the coupling inlet 7. The inlet 7 is conveniently mounted within the hollow cartridge or cassette 1 by means of circular flanges 13 engaged with corresponding circular apertures in the upper and lower halves 5 and 6 of the cartridge casing 4. The outlet port 11 is coupled with a spray distributing system which includes spray tubes 15 and 16, such as flexible Teflon tubes, positioned within the cartridge case 4 so that their outlets 17 and 18 are immediately adjacent the operative portions of the recording heads 2 when the cartridge 1 is inserted into cleaning position in the apparatus. A preferred form of the spray distributing means includes a main distributing tube 19 cemented or otherwise fastened at one end to the outlet port 11 and having its opposite end pressed into engagement with and sealed by cement or otherwise around the spray tubes 15 and 16. The outer or spraying ends 17 and 18 or the spray tubes 15 and 16 are conveniently supported in apertures in the adjacent cartridge structure or if such structure is not available, a suitable support may be provided at the ends of the tubes 15 and 16 to maintain their position so that they spray and clean the portions of the recording heads which are coated or which accumulate foreign matter during normal operation.

FIG. 4 illustrates a generally similar but slightly modified arrangement where the inlet 20 for the spray can nozzle is mounted on an end surface 21 of the cartridge 22. Tubing 23, 24 and 25 is included for directing the cleaning spray in the manner already described. This arrangement is useful in those pieces of equipment where the cartridge top and bottom portions may be almost entirely enclosed during operation. In this case, the inlet 20 is mounted by being cemented or otherwise attached to an aperture in an exposed portion of the cartridge such as its end surface 21. This arrangement, or a somewhat similar arrangement, is particularly useful in the stereo-type players widely used in automobiles where the player is mounted in or beneath the instrument panel and where the stereo cartridges are normally inserted into an opening so that only the rearmost portion of the stereo cartridge is exposed during play. The cleaning system of the present invention is seen to be particularly useful in these applications and in these cases the spray nozzle inlet is positioned on any convenient surface of the cartridge which is exposed during normal play.

Suitable spray cleaners are commercially available which when applied to the surfaces of recording heads soften and remove the accumulated deposits. A convenient form of these sprays is a pressure packed or aerosol container containing isopropyl alcohol or Freon as other cleaning fluids.

It will be seen that an improved and convenient cleaning means has been provided for cartridge or cassette-type tape recorder-reproducer devices. The cleaning means in accordance with the present invention is readily inserted in place of a conventional cartridge or cassette so that the recorder-reproducer equipment can be cleaned and restored to an efficient operating condition in a matter of seconds. The cleaning system in accordance with the present invention has also been made adaptable to presently used magazines or cassettes so that it may be directly incorporated into such magazines or cassettes with only minor modifications.

The system in accordance with the present invention is also adaptable for direct use with the several types of cartridge or cassette systems now being used as it may be inserted and removed in the same manner as are the regular cassettes or cartridges themselves. It is useful in all types of cassette recorder-reproducers and in the widely used stereo systems used in homes or automobiles which are known as stereo cartridge or stereo tape systems.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A cleaning means for cartridge-type tape recorder-reproducer in which the tape is mounted within a removable cartridge casing having standard shape and size for insertion into and out of playing position in the recorder-reproducer with the tape exposed to a recording-reproducing head through an aperture in the casing comprising the combination of a cleaner casing of the said standard shape and size for insertion into the regular recording-reproducing position, a cleaner inlet in said casing positioned on an exposed portion of the inserted casing, outlet means on said casing for directing the cleaner onto a recording-reproducing head, and tube means in said casing connecting said inlet and said outlet means.

2. The cleaning means as claimed in claim 1 in which said cartridge casing includes a plurality of outlets coupled by said conduit means to said inlet.

3. The cleaning means as claimed in claim 1 in which said inlet is positioned on an upper exposed portion of the inserted casing.

4. The cleaning means as claimed in claim 1 in which said inlet is positioned on a rearward exposed portion of the inserted casing.

5. A spray cleaning means for cartridge-type tape reproducer in which the tape is mounted within a removable cartridge casing having standard shape and size for insertion into and out of playing position in the reproducer with the tape exposed to a reproducing head through an aperture in the casing comprising the combination of a cleaner casing of the said standard shape and size for insertion into the regular reproducing position, a cleaner spray inlet in said casing positioned on an exposed portion of the inserted casing and adapted for being removably coupled to a source of cleaner spray, spray outlet means on said casing for spraying the cleaner onto a reproducing head, and tube means in said casing connecting said inlet and said outlet means.

6. The cleaning means as claimed in claim 5 in which said cartridge casing includes a plurality of spray outlets coupled by said conduit means to said spray inlet.

7. The cleaning means as claimed in claim 5 in which said spray inlet is positioned on an upper exposed portion of the inserted casing.

8 The cleaning means as claimed in claim 5 in which said spray inlet is positioned on a rearward exposed portion of the inserted casing.